US011827136B1

(12) United States Patent
Conway

(10) Patent No.: US 11,827,136 B1
(45) Date of Patent: Nov. 28, 2023

(54) PACKING CRATE DEVICE FOR TRACTOR TRAILERS

(71) Applicant: Joe Conway, Lincoln, NE (US)

(72) Inventor: Joe Conway, Lincoln, NE (US)

( * ) Notice: Subject to any disclaimer, the term of this patent is extended or adjusted under 35 U.S.C. 154(b) by 344 days.

(21) Appl. No.: 17/217,800

(22) Filed: Mar. 30, 2021

Related U.S. Application Data

(60) Provisional application No. 63/020,985, filed on May 6, 2020, provisional application No. 63/002,025, filed on Mar. 30, 2020.

(51) Int. Cl.
*B60P 1/64* (2006.01)
*B60J 5/04* (2006.01)
*B62D 59/04* (2006.01)

(52) U.S. Cl.
CPC ......... *B60P 1/6481* (2013.01); *B60J 5/0498* (2013.01); *B62D 59/04* (2013.01)

(58) Field of Classification Search
CPC ..... B60P 1/6481; B60P 1/6427; B60P 1/4414; B60J 5/0498; B62D 59/04
USPC ....................................... 280/404
See application file for complete search history.

(56) References Cited

U.S. PATENT DOCUMENTS

| 6,634,658 | B2* | 10/2003 | Larouche | B62B 5/0086 414/458 |
| 8,646,753 | B2* | 2/2014 | Ross | B62D 53/04 254/5 R |
| 10,933,795 | B2* | 3/2021 | Shelagowski | B66F 9/24 |
| 11,167,682 | B2* | 11/2021 | Helou, Jr. | B60K 7/0007 |
| 2004/0013504 | A1* | 1/2004 | Schults | B65D 90/146 414/458 |
| 2008/0054580 | A1* | 3/2008 | Glaser | B62B 5/0086 280/35 |
| 2013/0121797 | A1* | 5/2013 | Welch | B60P 1/6445 414/498 |
| 2020/0189886 | A1* | 6/2020 | Thompson | B66C 11/04 |

OTHER PUBLICATIONS

"Photo of the day Schweiss Container", retrieved from Internet Archive Wayback Machine ,https://web.archive.org/web.20150725032825/https://www.bifold.com/photo-of-the-day-schweiss-container.php> on Aug. 2, 2021, 20 pages, Jul. 25, 2015.

* cited by examiner

*Primary Examiner* — Minnah L Seoh
*Assistant Examiner* — Ryan Edward Hardy
(74) *Attorney, Agent, or Firm* — Suiter Swantz pc llo

(57) ABSTRACT

Multiple actuation devices may be coupled to a shipping crate. A first actuation device may be coupled to a first end of the shipping crate and a second actuation device may be coupled to a second end of the shipping crate. The actuation devices include various telescopic columns, by which the shipping crate may be raised and lowered. Some of the columns include a caster for rolling the shipping crate. Other columns include a drive unit for driving the shipping crate. By utilizing the actuation devices, the shipping crate may be loaded and unloaded from a trailer without the need for a forklift.

19 Claims, 12 Drawing Sheets

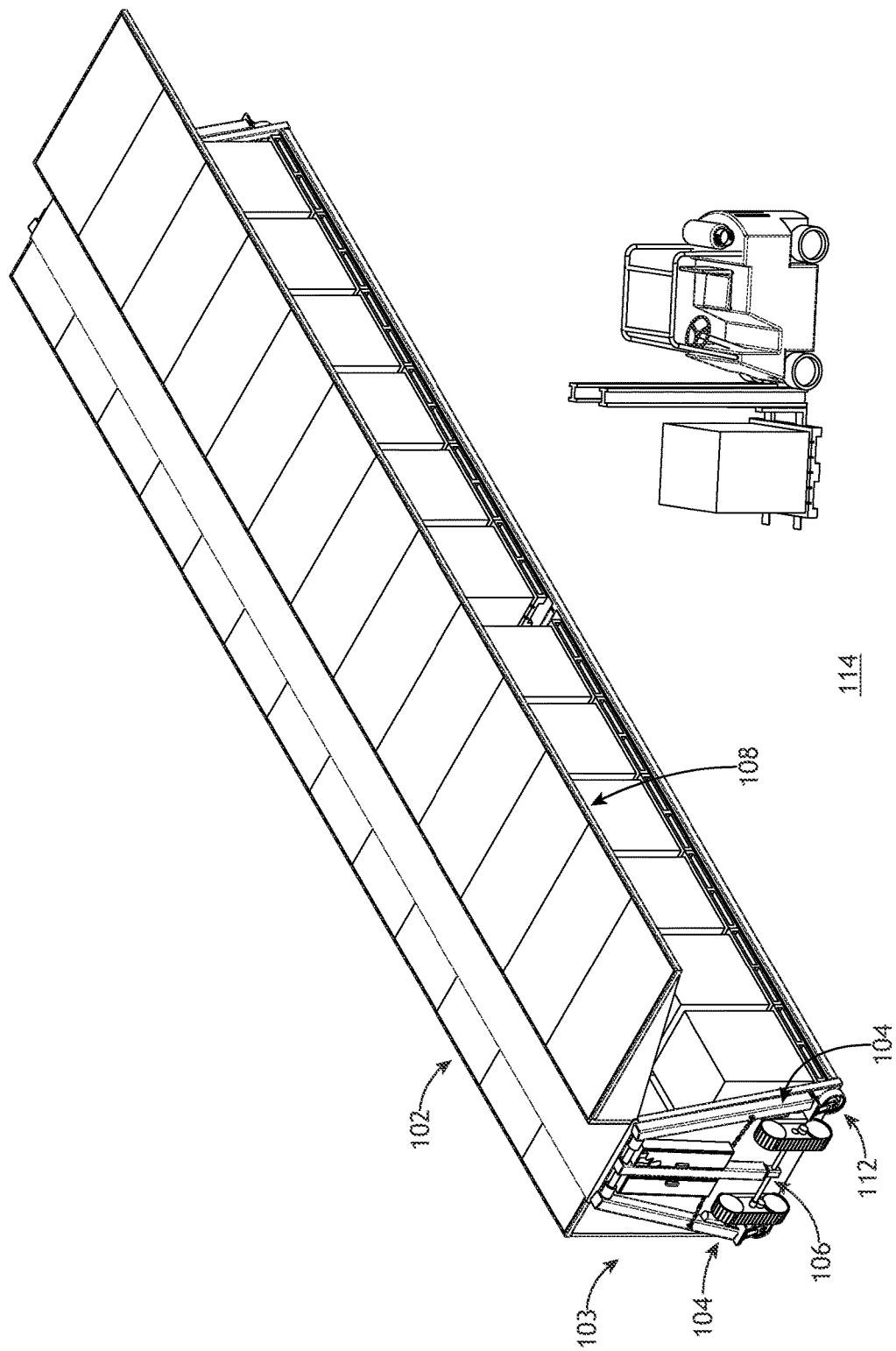

PACKING CRATE DEVICE FOR TRACTOR TRAILERS

CROSS-REFERENCE TO RELATED APPLICATION

The present application claims the benefit under 35 U.S.C. § 119(e) of U.S. Provisional Application Ser. No. 63/002,025, filed Mar. 30, 2020, and U.S. Provisional Application Ser. No. 63/020,985, filed May 6, 2020, which are incorporated herein by reference in their entirety.

BACKGROUND

Shipping crates are commonly used to transport goods. The shipping crates may be transported by railway. Another form of transporting goods includes truck trailer shipping. To load the trailer, boxes must be loaded from front to back. To access a box in the front of the trailer, the entire truck must be unloaded. While the trailer is being unloaded, the trailer must remain present at the location. To continue hauling freight, the truck driver must unhitch from the trailer before hitching to a different trailer. Therefore, it would be advantageous to provide a system and method that cures the shortcomings described above.

SUMMARY

An actuation device is disclosed in accordance with one or more embodiments of the present disclosure. In one embodiment, the actuation device includes a first column and a second column. In another embodiment, each of the first column and the second column include an inner portion and an outer portion. In another embodiment, each of the first column and the second column are configured to extend and retract by telescoping the inner portion relative to the outer portion. In another embodiment, the actuation device includes a first caster and a second caster. In another embodiment, the first caster is coupled to an end of the first column. In another embodiment, the second caster is coupled to an end of the second column. In another embodiment, the actuation device includes a center column positioned between the first column and the second column. In another embodiment, the center column is pivotably connected to first column and the second column at a first end of the center column. In another embodiment, the center column is configured to extend and retract. In another embodiment, the first column and the second column are configured to extend when the center column is extended and remain extended when the center column is retracted. In another embodiment, each of the first caster and the second caster are configured to support at least a portion of the center column when the center column is retracted. In another embodiment, the actuation device includes a drive unit pivotably connected to a second end of the center column. In another embodiment, the drive unit is configured to engage a ground surface when the center column is extended.

A system is disclosed in accordance with one or more embodiments of the present disclosure. In one embodiment, the system includes a shipping crate including a first end and a second end. In another embodiment, the shipping crate includes a door between the first end and the second end of the shipping crate. In another embodiment, the door is configured to open for accessing an interior of the shipping crate. In another embodiment, the system includes a first actuation device coupled to the first end of the shipping crate. In another embodiment, the first actuation device is configured to lift the first end of the shipping crate. In another embodiment, a second actuation device is coupled to the second end of the shipping crate. In another embodiment, the second actuation device is configured to lift the second end of the shipping crate. In another embodiment, each of the first actuation device and the second actuation device includes a first column and a second column. In another embodiment, each of the first column and the second column include an inner portion and an outer portion. In another embodiment, each of the first column and the second column are configured to extend and retract by telescoping the inner portion relative to the outer portion. In another embodiment, each of the first actuation device and the second actuation device includes a first caster and a second caster. In another embodiment, the first caster is coupled to an end of the first column. In another embodiment, the second caster is coupled to an end of the second column. In another embodiment, each of the first actuation device and the second actuation device includes a center column positioned between the first column and the second column. In another embodiment, the center column pivotably connects to the first column and the second column at a first end of the center column. In another embodiment, the center column is configured to extend and retract. In another embodiment, the first column and the second column are configured to extend when the center column is extended and remain extended when the center column is retracted. In another embodiment, each of the first caster and the second caster are configured to support at least a portion of the center column when the center column is retracted. In another embodiment, each of the first actuation device and the second actuation device includes a drive unit pivotably connected to a second end of the center column. In another embodiment, the drive unit is configured to engage a ground surface when the center column is extended.

A method is disclosed in accordance with one or more embodiments of the present disclosure. In one embodiment, the method includes deploying a front tug and a rear tug from a stowed position to engage a ground. In another embodiment, the method includes moving, by the front tug and the rear tug, a shipping crate attached to the front and the rear tug to an opening of the trailer. In another embodiment, the method includes transitioning the front tug from engaging the ground to engaging a bed of the trailer. In another embodiment, the method includes moving, by the front tug and the rear tug, a portion of the shipping crate within the trailer until the rear tug is at the opening of the trailer. In another embodiment, the method includes transitioning the rear tug from engaging the ground to engaging the bed of the trailer. In another embodiment, the method includes moving, by the front tug and the rear tug, the shipping crate within the trailer.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 1A illustrates a top rear perspective view of a system being loaded from a sidewall, in accordance with one or more embodiments of the present disclosure;

FIG. 1I illustrates a top rear perspective view of a system fully stowed in a trailer, in accordance with one or more embodiments of the present disclosure;

DETAILED DESCRIPTION OF THE INVENTION

Reference will now be made in detail to the subject matter disclosed, which is illustrated in the accompanying drawings.

The present disclosure generally relates to systems, methods, and actuation devices for loading and unloading trailers. The actuation device provides several features, such as being able to loaded or unload a shipping crate from a trailer without the use of a forklift. The actuation device is further able to be rolled onsite to maneuver a shipping crate for unloading material from the shipping crate. Additionally, the shipping crate may be loaded or unloaded from a side of the shipping crate. The shipping container may include a variety of material, such as, but not limited to, bulk material, palletized goods, consumer housing, or a biocontainment suite. Portability of isolation suites may allow for the isolation suites to be placed outside of hospitals to keep the viral treatments away from non-bioagent contaminated persons.

Referring generally to FIGS. 1A-4, a system 100, actuation device 103, and method 400 are shown and described, in accordance with one or more embodiments of the present disclosure. The system 100, actuation device 103, and method 400 may be utilized to load or unload a shipping crate onto (or out of) a trailer (e.g., a semi-trailer).

Figure 1B:
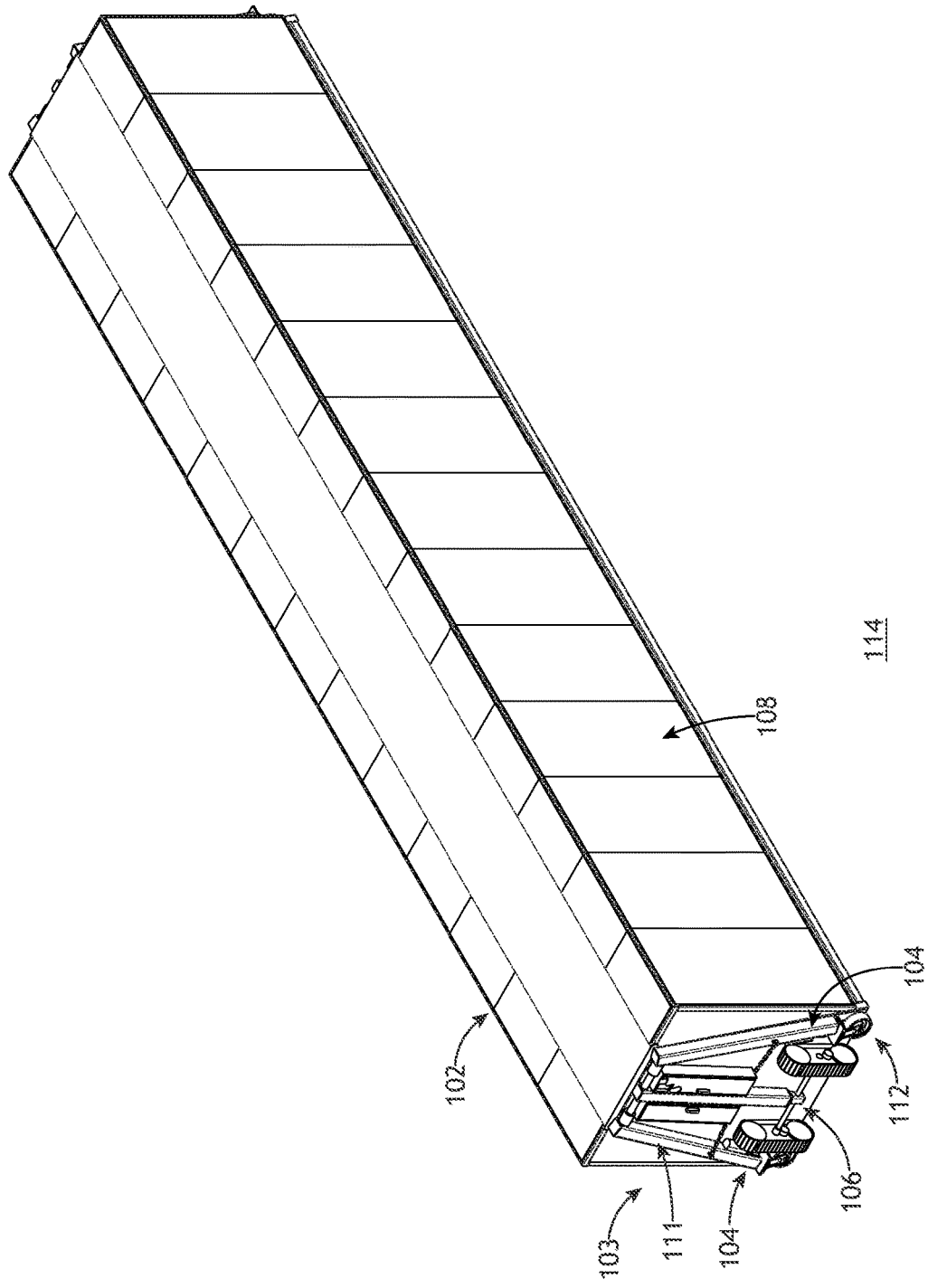
FIG. 1B illustrates a top rear perspective view of a system with a center column and telescoping columns in a retracted position and a tug in a stowed position, in accordance with one or more embodiments of the present disclosure.
Figure 1C:
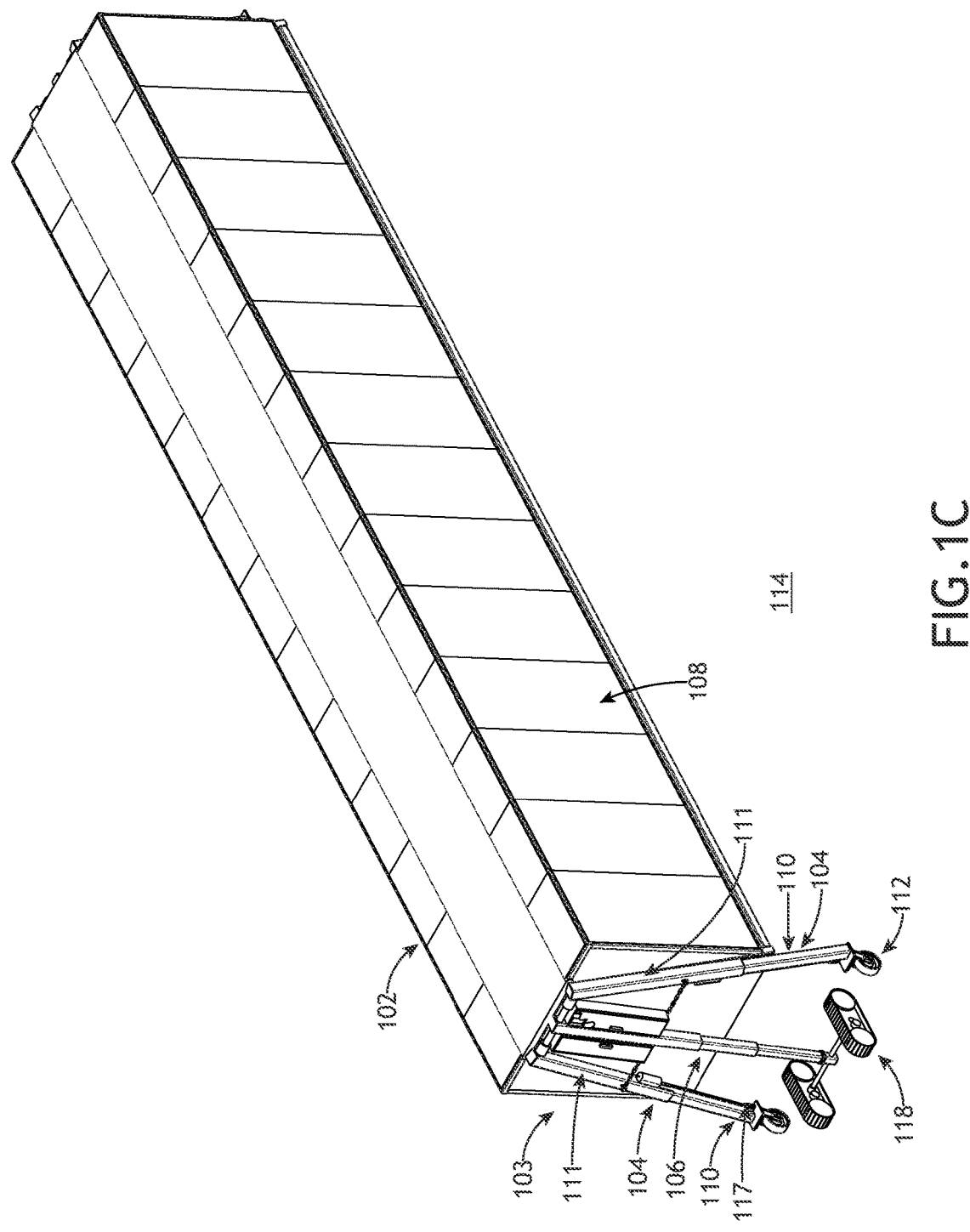
FIGS. 1C-D illustrates a top rear perspective view of a system with a tug and casters supporting a shipping crate when a center column and telescoping columns are in an extended position, in accordance with one or more embodiments of the present disclosure.
Figure 1D:
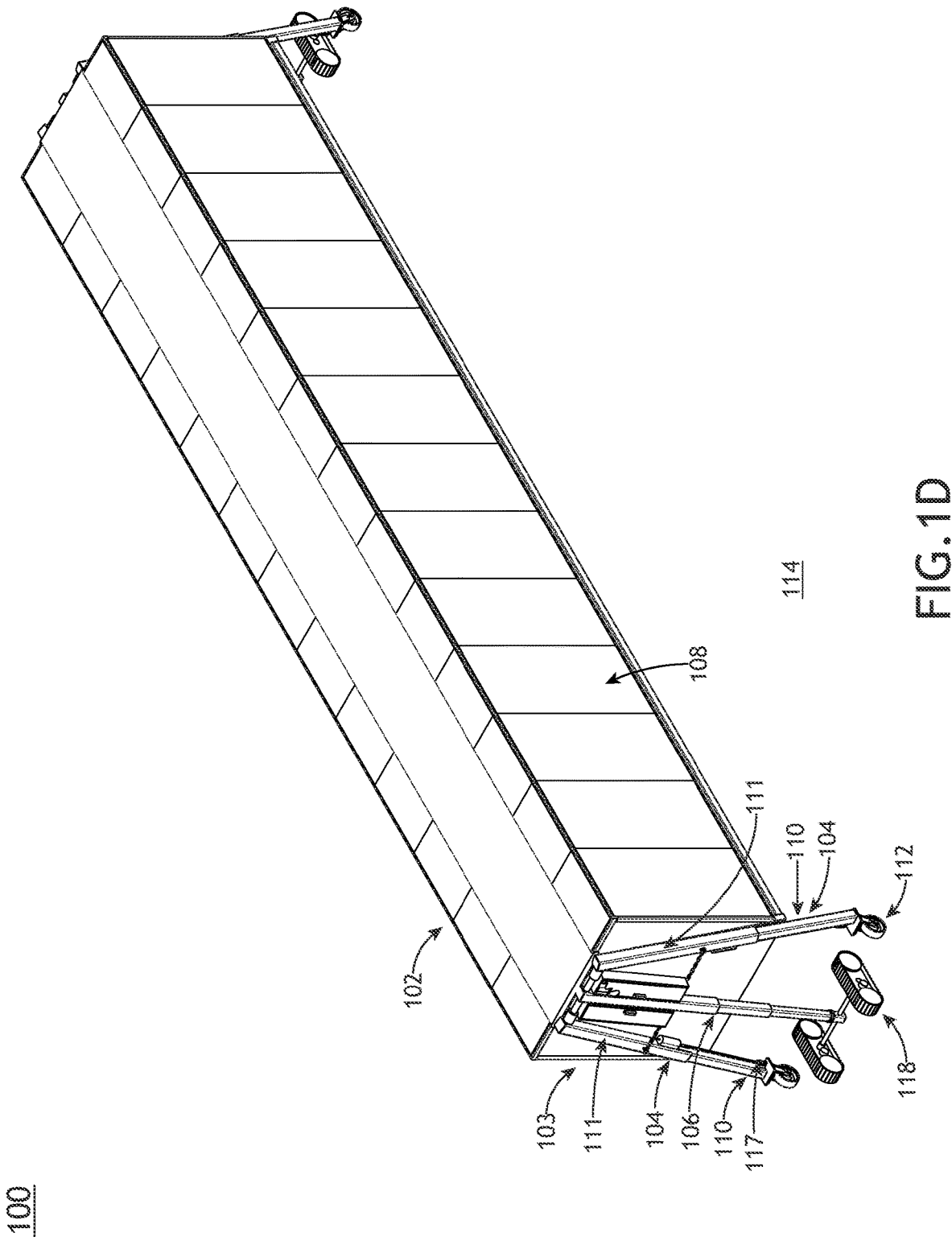
Figure 1E:
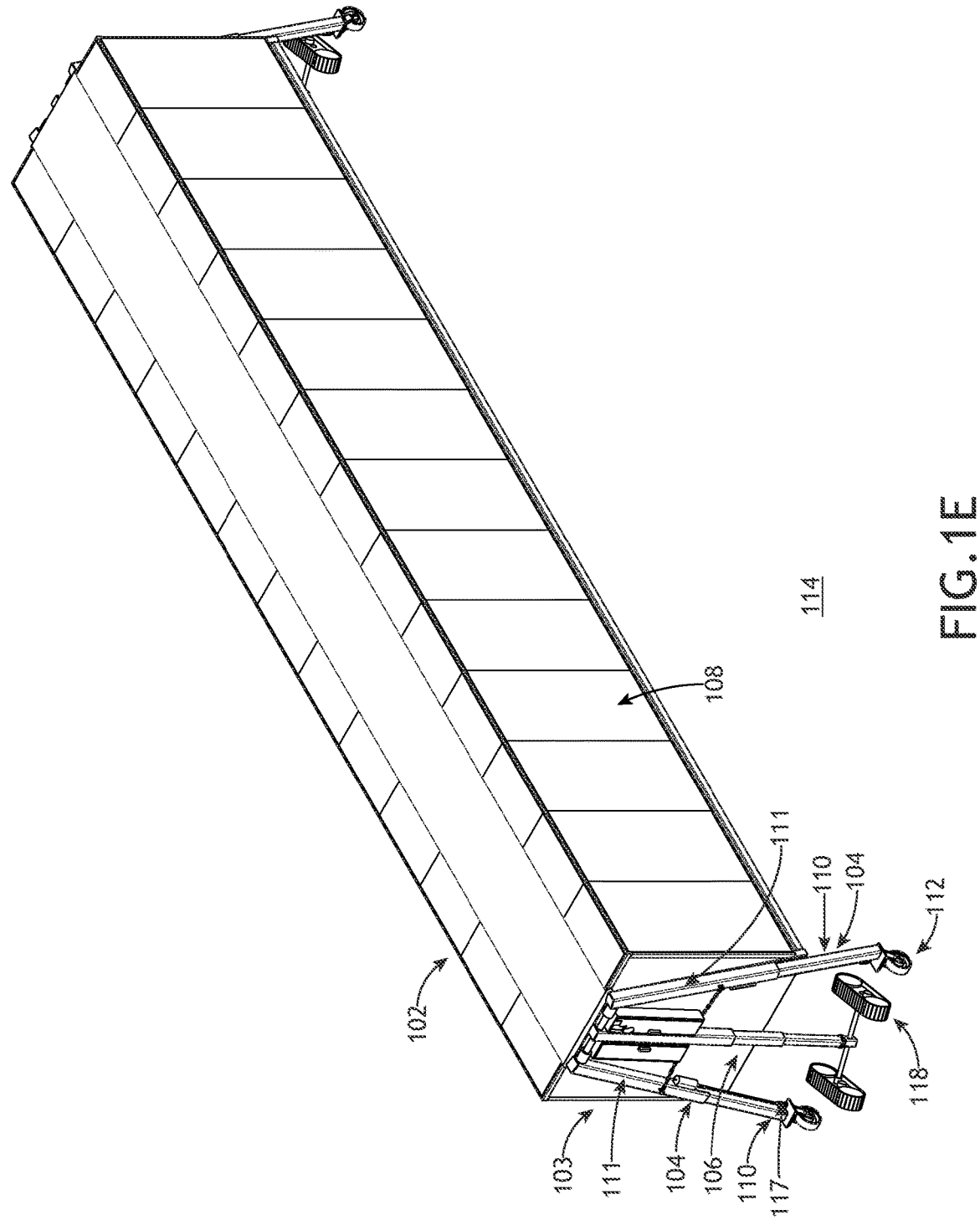
FIG. 1E illustrates a top rear perspective view of a system where a tug is controlling a movement of a shipping crate, in accordance with one or more embodiments of the present disclosure.
Figure 1F:
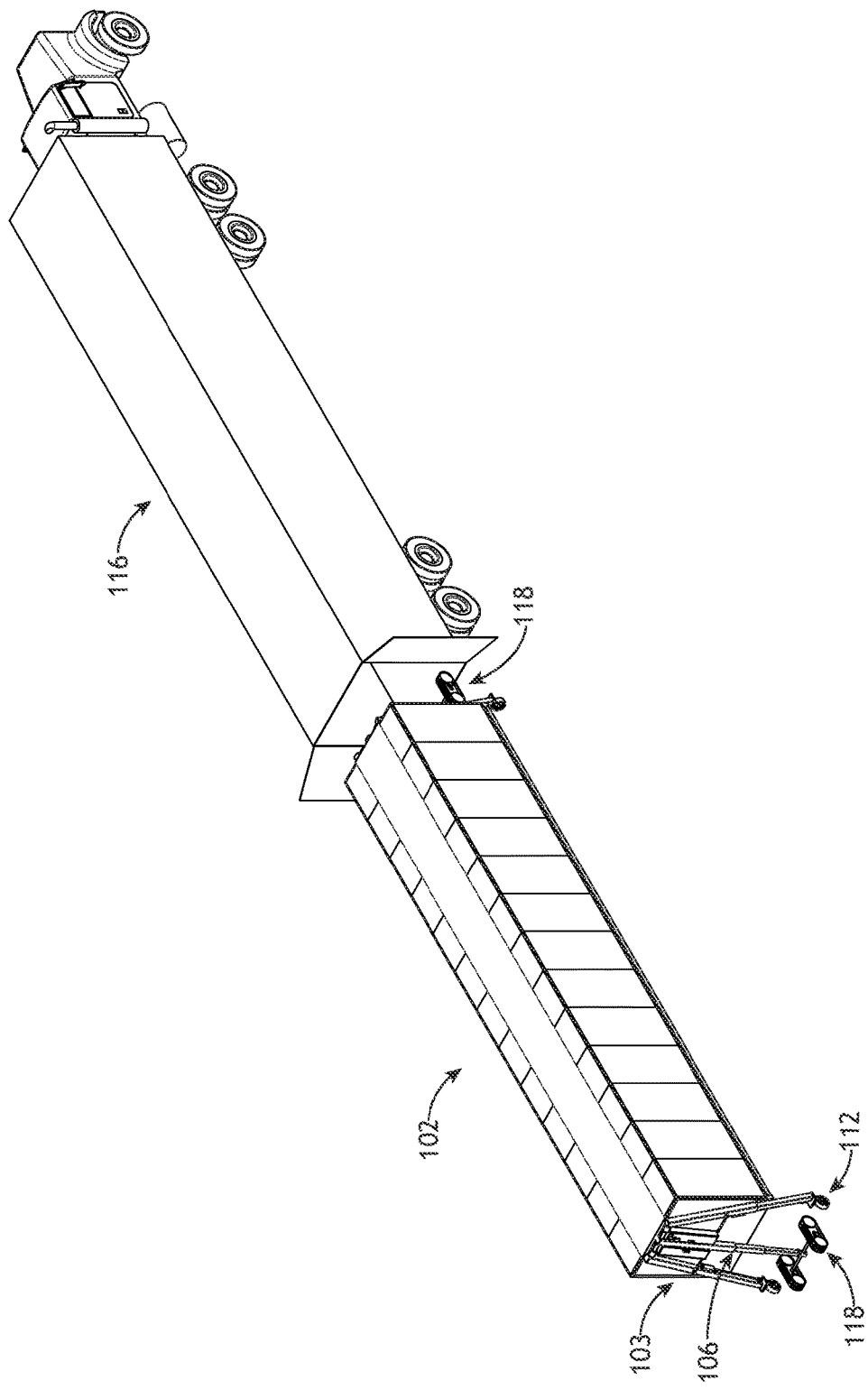
FIG. 1F illustrates a top rear perspective view of a system with a front tug transitioned from a ground surface to a bed of a trailer, in accordance with one or more embodiments of the present disclosure.
Figure 1G:
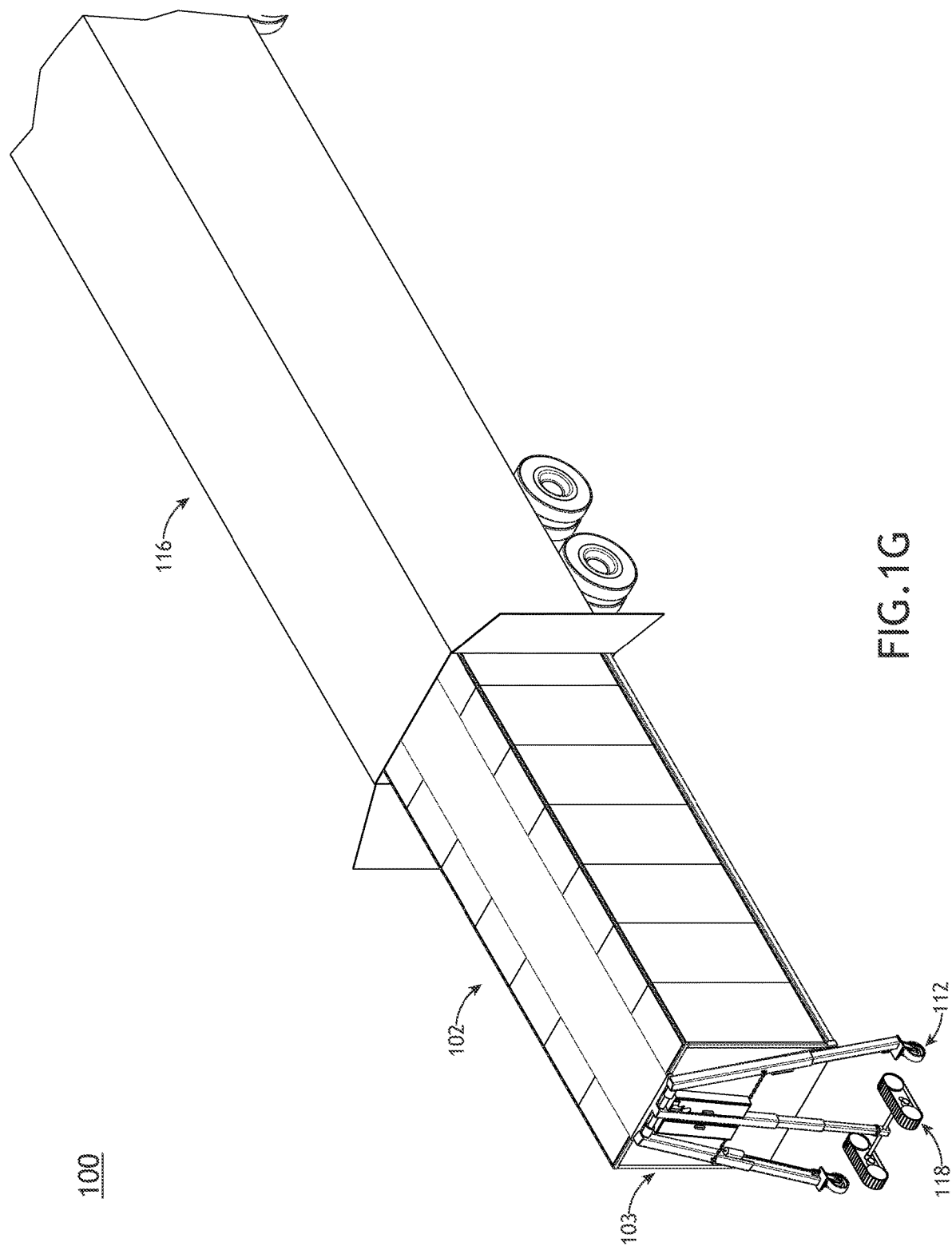
FIG. 1G illustrates a top rear perspective view of a system with a portion of the shipping container being moved into a trailer, in accordance with one or more embodiments of the present disclosure.
Figure 1H:
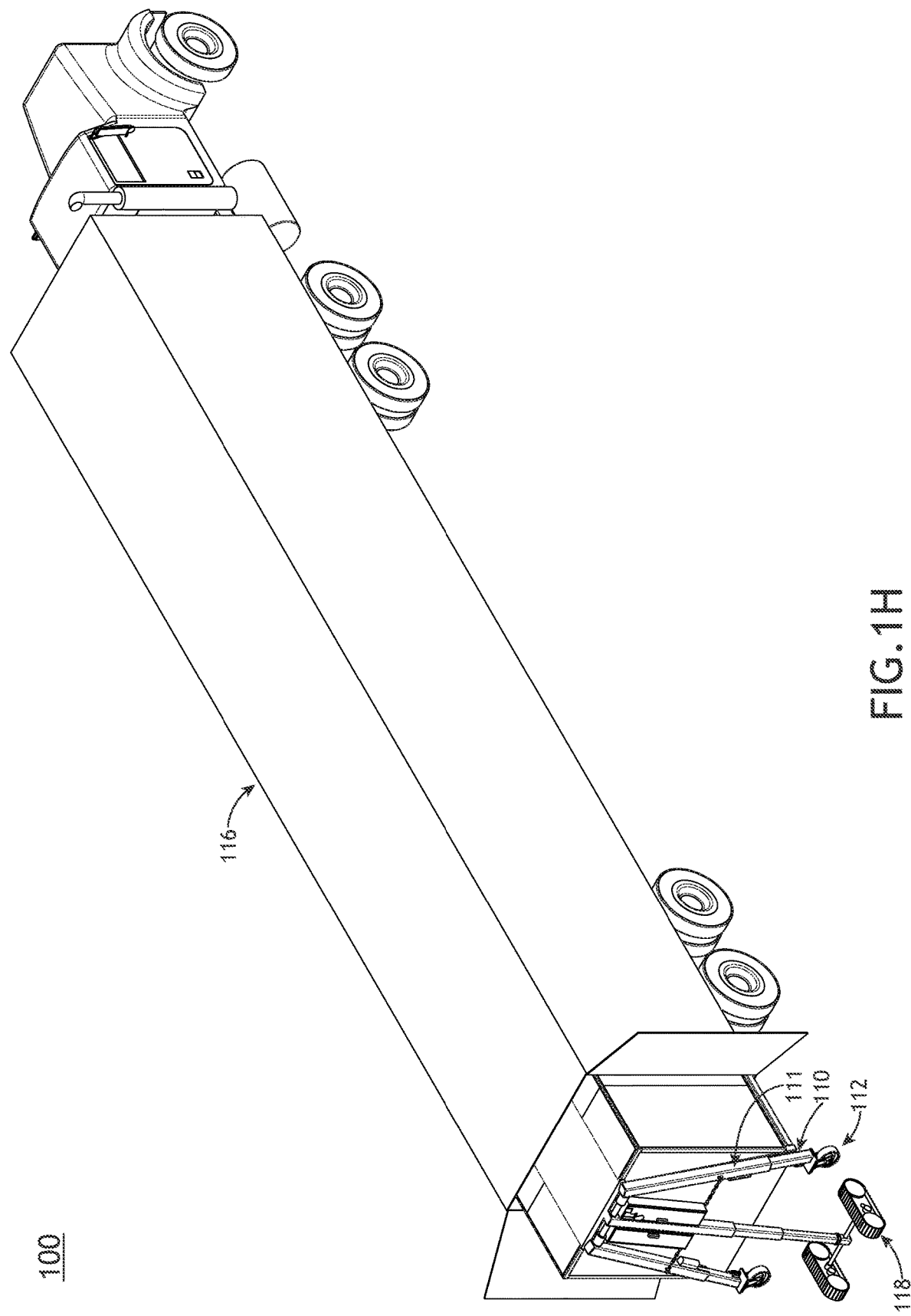
FIG. 1H illustrates a top rear perspective view of a system with casters being raised by rear telescoping columns, in accordance with one or more embodiments of the present disclosure.
Figure 11:
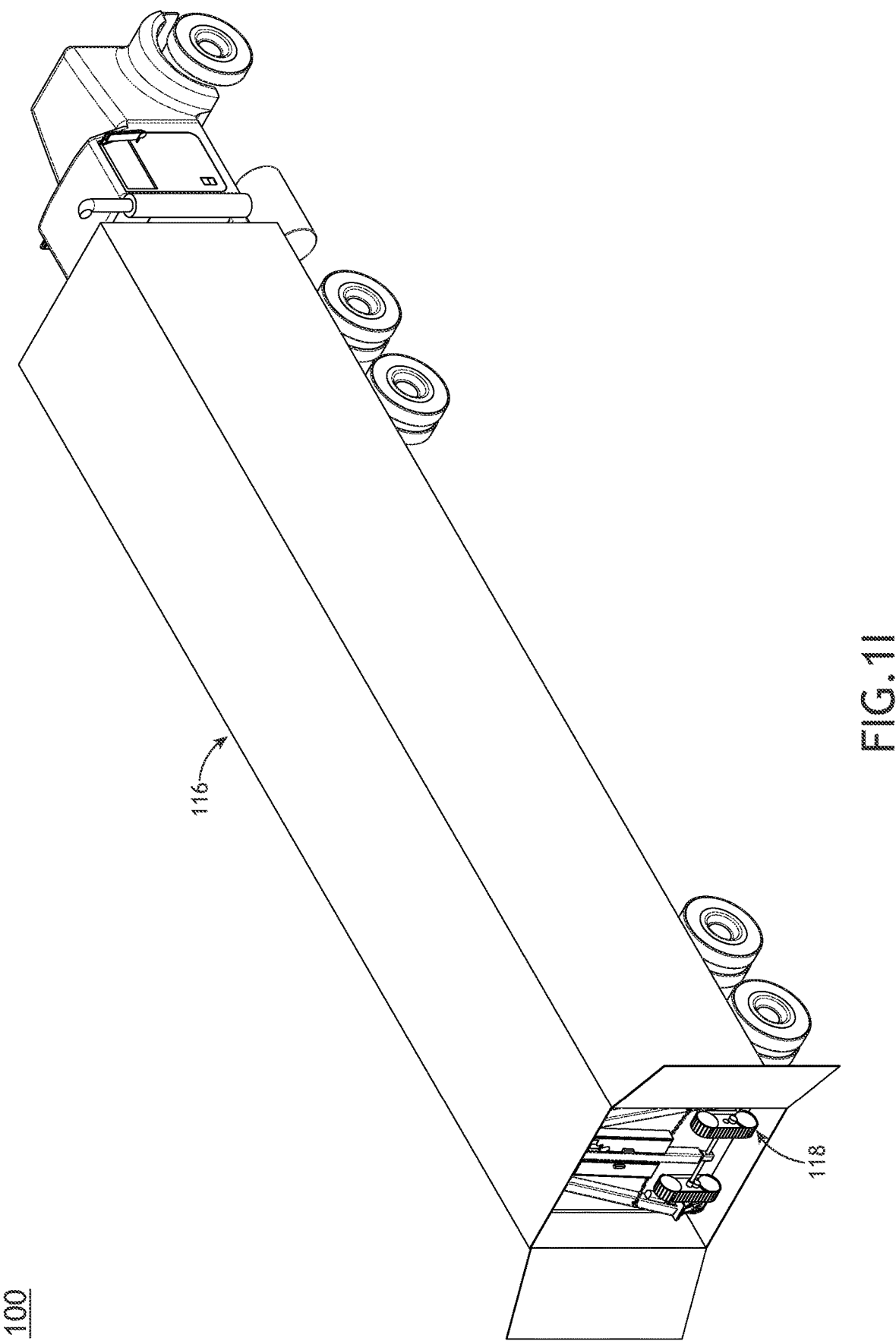
Figure 2:
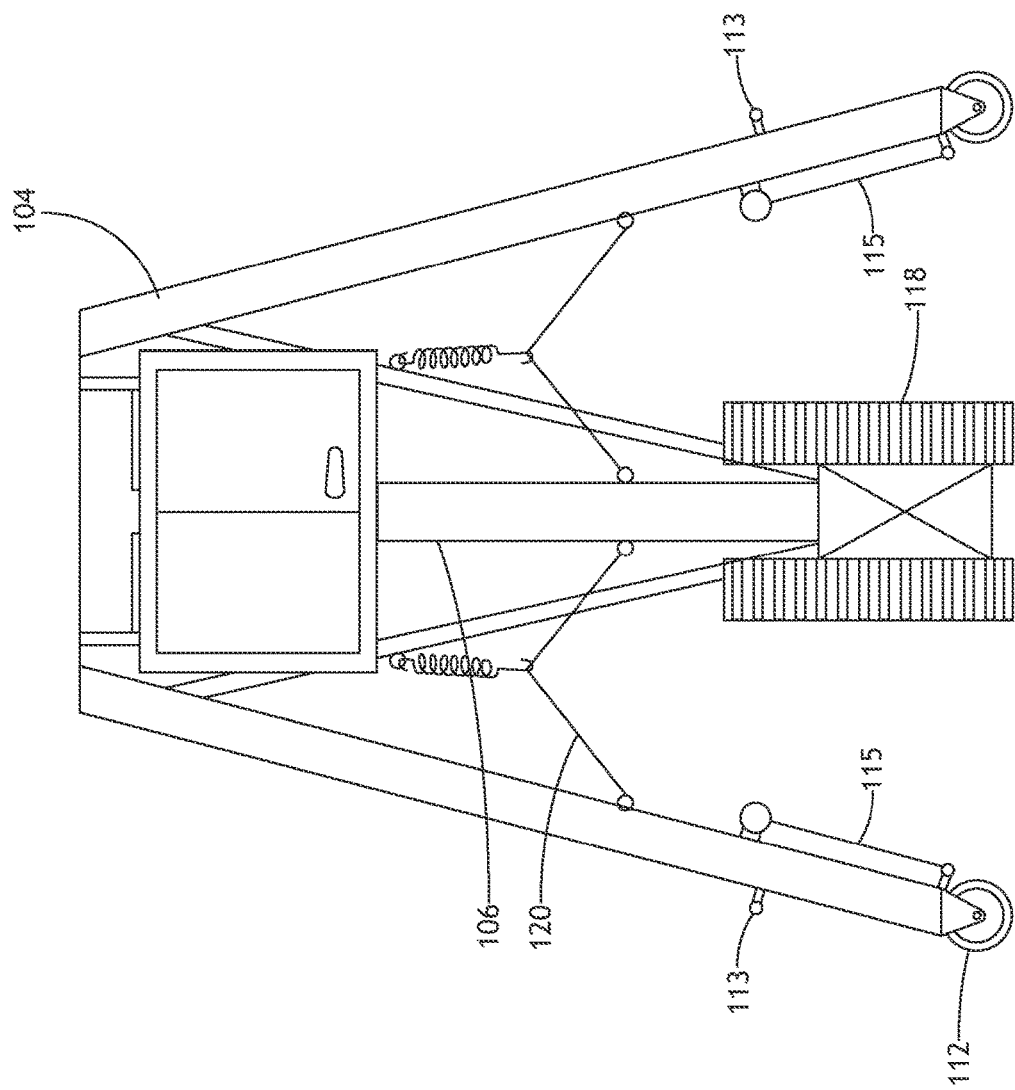
FIG. 2 illustrates a front view of an actuation device, in accordance with one or more embodiments of the present disclosure.
Figure 3:
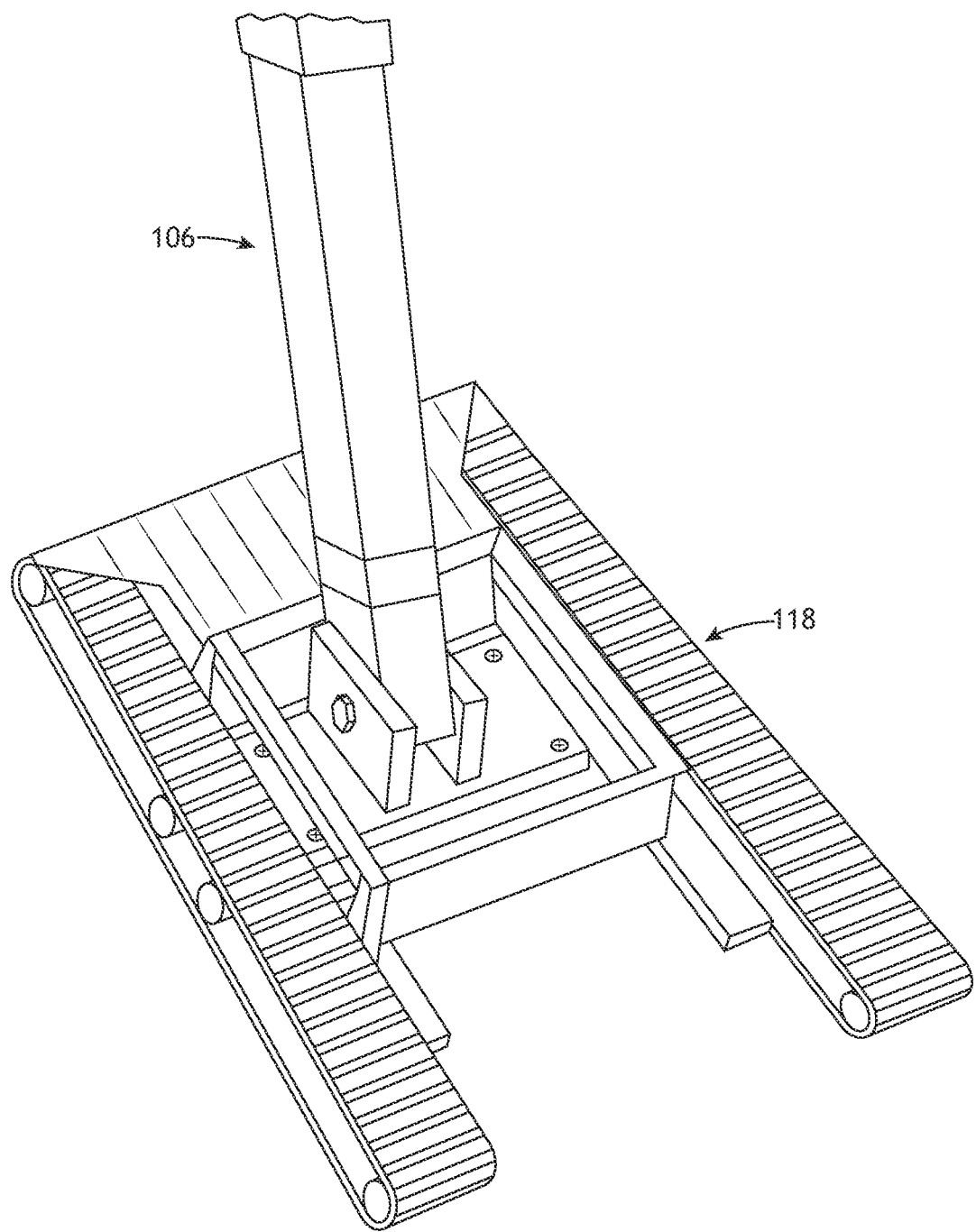
FIG. 3 illustrates a tug, in accordance with one or more embodiments of the present disclosure.

FIGS. 1A-1L illustrates a system 100 for loading and unloading shipping crates from a trailer, in accordance with one or more embodiments of the present disclosure. In some embodiments, the system 100 includes a shipping crate 102 and two actuation devices 103. For example, the system 100 may include a first actuation device 103 coupled to a first end of the shipping crate 102 and a second actuation device 103 coupled to a second end of the shipping crate 102. The actuation devices 103 may be configured to lift the ends of the shipping crate 102. The actuation devices 103 may also be configured to move the shipping crate 102. The shipping crate 102 may include a door disposed between the two actuation devices 103. Each of the two actuation devices 103 may include a first and a second telescoping column 104 and a center column 106. For example, the center column 106 may be disposed between the first and the second telescoping columns 104. The telescoping columns 104 may be disposed on corners of the shipping crate 102. The telescoping columns 104 may support the system 100. The telescoping columns 104 may include an inner portion 110 and an outer portion 111. The inner portion 110 may be extended by 4 feet or more relative to the outer portion 111 (as depicted in FIG. 1C). The length by which the inner portion 110 of the telescoping columns 104 may be extended may be based on a height of a floor of the trailer relative to ground (e.g., typical trailers have rear openings that are 4 feet from the ground). Thus, a bottom surface of the shipping crate 102 may be disposed above the floor of a trailer 116 when the telescoping columns 104 are in an extended position. Each of the actuation devices 103 may further include one or more casters 112 (i.e., an undriven wheel). The casters 112 may be coupled to an end the telescoping columns 104, such as an end of the inner portion 110. Such casters 112 may allow for controlling the movement and orientation of the system 100 when the weight of the shipping crate 102 is supported by the telescoping columns 104. The telescoping columns 104 may also be retracted when the system 100 is stored on the ground 114 or in the trailer 116 (e.g., by retracting the inner portion 110).

In some embodiments, the telescoping columns 104 include one or more locks. The locks may be configured to retain the telescoping columns 104 in a fixed position. The one or more locks may include, but are not limited to, pins 113 (see FIG. 2), solenoid locks, or screw locks. Each lock may lock one of the telescoping columns 104 at a desired length. The ability to lock the telescoping columns 104 is desirable because the weight of components of the actuation device 103 (e.g., the center column 106) and/or the shipping crate 102 may be supported by the telescoping columns 104 in an extended position and in a retracted position (e.g., by transferring a portion of the weight between the inner portion 110 and the outer portion 111 by the locks). For example, each of the inner portion 110 and the outer portion 111 of the telescoping columns 104 may include a hole disposed at a first position and a hole disposed at a second position. When the holes of the inner portion 110 and the outer portion 111 line up, the lock may be inserted in the hole, thereby locking the telescoping columns 104.

In some embodiments, when the telescoping columns 104 are in the extended position, the system 100 may roll by the casters. Furthermore, the telescoping columns 104 may be retracted, reducing a height of the system 100. In this regard, the telescoping columns 104 may be retracted when the system 100 is being stored in the trailer 116. The telescoping columns 104 may be extended or retracted any suitable means, such as, but not limited to, gravitational forces, winch (e.g., an electric winch), jackscrew, or human work.

For example, the actuation devices 103 may each include a winch 115 (see FIG. 2) coupled to the inner portion 110 and the outer portion 111, for raising or lowering the telescoping columns 104. By way of another example, the actuation devices 103 may each includes a jackscrew 117 coupled to the inner portion 110 and the outer portion 111, for raising or lowering the telescoping columns 104. In some embodiments, the telescoping columns 104 provide a lifting force to raise the shipping crate 102. In this regard, the telescoping columns 104 may be extended and retracted by any suitable means, including, but not limited to, a hydraulic cylinder, a lead screw, the jackscrew 117, or a rack and pinion.

In some embodiments, the telescoping columns 104 are angled outward at a pitch relative to a ground surface. The angle of the telescoping columns 104 may be at an 8 to 2 pitch. In this regard, where the inner portion 110 of the telescoping columns 104 are extended 4 feet, the casters 112 are 10 feet apart; and where the inner portion 110 of the telescoping columns 104 are fully retracted, the casters 112 are 8 feet apart. Where the telescoping columns 104 include a pitch, the slope of the telescoping columns 104 may permit a door (e.g., sidewall 108) to include a portion of the shipping crate 102 roof. For example, the portion may include two feet of the roof. Where the telescoping columns 104 include a pitch, the door may also include one or more triangular wedges at the ends of the shipping crate 102. The geometry and dimensions described above is not intended to limit the scope of the present disclosure and is merely intended to provide an illustrative example of a way to configure the telescoping columns to support the shipping crate 102. In this regard, there may be a variety of geometric configurations of the telescoping columns 104, such as, but not limited to vertical telescoping columns (not depicted).

In some embodiments, the actuation device 103 may include a center column 106. The center column 106 may be disposed between the telescoping columns 104. When the actuation device 103 is coupled with the shipping crate 102, the center column 106 may be disposed at a midpoint of the end of the shipping crate 102, although this is not intended to be limiting. In some embodiments, the center column 106 is extendable and retractable. Such extension and retraction may occur by any suitable means, including, but not limited to, an inverting rotating screw jack with nut movement or an electric winch. By way of another example, the center columns 106 may be extendable and retractable by one or more of a hydraulic cylinder, a lead screw, a screw jack, or a rack and pinion. The center column 106 may be made of tubing, such as, but not limited to, square tube (e.g., 4" square tube inside of 5" square tube) or circular tube. In some embodiments, the center column 106 may include multiple stages, such as, but not limited to, three-stages.

In some embodiments, the actuation device 103 may each include a drive unit connected to a second end of the center column 106. The drive unit may move the actuation device 103 and similarly the shipping crate 102. The drive unit may include any suitable drive unit, such as, but not limited to, a tug 118 (see FIG. 3, for example). The tug 118 may also be configured to pivot about the center column 106, for controlling an orientation of the shipping crate 102. For example, the tug 118 may be an electric 22.5 Tracktech T1X2 tug or a T2V2 tug. In this regard, the tug 118 may be suitable for pulling between 8,000 to 21,000 with full 360-degree mobility. The tug 118 may be controlled by one or more electronic control systems. The tug 118 may be connected to the end of the center column 106. The tug 118 may be connected by one or more opposing dog-ear tabs with a pin through one or more holes. In some embodiments, the drive unit (e.g., the tug 118) may be rotated between a first position and a second position. For example, the first position may correspond to a position where the drive unit is parallel to an end face of the trailer 116 and has a minimal profile (e.g., a stowed position, as depicted in FIGS. 1A-1B, 1L, 2) and the second position of the drive unit may correspond to a position where the drive unit is parallel to a bottom of the trailer 116 and/or the ground 114 (as depicted in FIGS. 1E-1H).

One or more cables 120 may be used to selectively control the center column 106. For example, the cable 120 may be coupled between the center column 106 and one or more of the telescoping columns 104 (see FIG. 2, for example). The cable 120 may restrict an angle by which the center column 106 may pivot. For example, the center column 106 may be rotate up to 22.5 degrees from vertical. One or more springs may be coupled to the cable 120 to damp the cable.

In some embodiments, the telescoping columns 104 are held together by angle iron (e.g., L shaped) welded to the back of the telescoping columns 104. The angle iron may overlap a portion of a top of the shipping crate 102 at a mid-line. A second piece of angle iron may hook under a bottom portion (e.g., along a midline) of the shipping crate 102. The actuation device 103 may further include one or more dog-ear flaps welded to the underside of the telescoping columns 104. By the angle iron, the actuation devices 103 may be coupled with the shipping crate 102 (e.g., by bolting to ends of the shipping crate 102).

In some embodiments, the shipping crate 102 includes a door disposed between the actuation devices 103. The door may be hinged along a roof of the shipping crate 102. The door may be opened and closed by one or more actuators (e.g., two actuators disposed at each side of the door). The door may also extend along a substantial portion of a side of the shipping crate. For example, the door may include a sidewall 108 (see FIG. 1A). The sidewall 108 may open a side of the shipping crate 102 for loading and unloading material from the shipping crate 102. The sidewall 108 may include one or more actuators to swivel the sidewall upwards, thereby exposing an interior of the actuation device (e.g., for loading and unloading). In this regard, the shipping crate 102 may be loaded and unloaded from a side of the shipping crate 102. For example, the sidewall 108 may provide access to an interior of the shipping crate 102 through an opening of 8 feet by 50 feet, as opposed to an opening of 8.5 feet by 9 feet 2 inches disposed at the end of a conventional shipping crate. The ability to load and unload from a side of the shipping crate 102 is advantageous in allowing for multiple forklifts or pallet jacks to unload or load material simultaneously. Similarly, selective unloading may be performed on only certain material contained by the system 100 (rather than unloading all material before the desired material). Furthermore, such side unloading may be beneficial where rear unloading would be space constrained. Although the door has been described as being a sidewall 108, this is not intended to be a limitation on the present disclosure. In this regard, the door of the shipping crate 102 may include any door between the first end and the second end by which the interior of the shipping crate 102 may be accessed.

The system 100 of the present disclosure may provide several useful features. For example, the shipping crate 102 may reduce exposure to the trailer 116 to any hazardous materials or substances (e.g., chemicals or biohazard contaminants) contained within the shipping crate 102. By way of another example, the system 100 may be loaded and unloaded from the trailer 116 when no dock door is present (e.g., by the actuation devices 103). By way of another example, the system 100 may be lowered to the ground before unloading of the shipping crate 102 occurs, which may reduce the work required when unloading the system 100 (e.g., pallets are lower to the ground and may be unloaded by pallet jack rather than forklift, etc.). By way of another example, the system 100 may be unloaded directly from the trailer 116 (e.g., directly into a warehouse by the dock door or at a consumer's home) before any material hauled by the system 100 is unloaded. In this regard, the trailer 116 may be free to leave (thereby reducing time wasted while the driver waits for the trailer 116 to be unloaded or preventing the need to use drop and hook methods). By way of another example, the system 100 may be used with existing trailers with minimal to no retrofitting.

In some embodiments, the system 100 includes an electronics system. The electronics system may include a control mechanism (e.g., one or more levers to control the movement of the center columns 106 and the telescoping columns 104). The electronics system may further include one or more batteries. The electronics system may further include one or more electronic sensors or cameras.

In some embodiments, the system 100 is fitted with one or more of portable office space, medical clinic space, isolation ward equipment, or seasonal housing units. For example, the shipping crate 102 may include an interior compartment with one or more leaves, where such leaves create a plurality of interior rooms. In this regard, the room size may be selectively controlled based on the desired application. When the system 100 is configured as a medical isolation ward, the shipping crate 102 may have an interior of 14 feet by 50 feet. There may be a 3 feet wide corridor with several 11 feet by 6 feet treatment rooms and a 14 feet by 6 feet laboratory. Each room may have 3 feet by 5 feet bath positioned in a rigid side of the treatment room, so that a 8 feet by 6 feet living quarter remains. The size of the rooms provided is merely exemplary and may change given the overall size of the system 100. The size and layout of such medical isolation wards may be designed to ensure biocontainment of any viral contaminants (e.g., including primary and secondary containments; storage containers; personal protection equipment; air handling, etc.).

In some embodiments, the shipping crate 102 may include one or more walls. The walls may any thickness suitable for shipping crates. For example, the wall thickness may be ⅜" or greater.

A typical trailer in the United States is between 48 and 53 feet, has an inside width of 100 inches (corresponding to a maximum outside width of 8.5 feet), and an inside height between 95 and 110 inches. The system 100 may be configured to fit within an interior surface of such a trailer. For example, the system 100 may have an exterior width of 8 feet, an exterior height of 104 inches, and an exterior length of 50 feet. In this regard, the system 100 may fit within an interior surface of the trailer.

Figure 4:
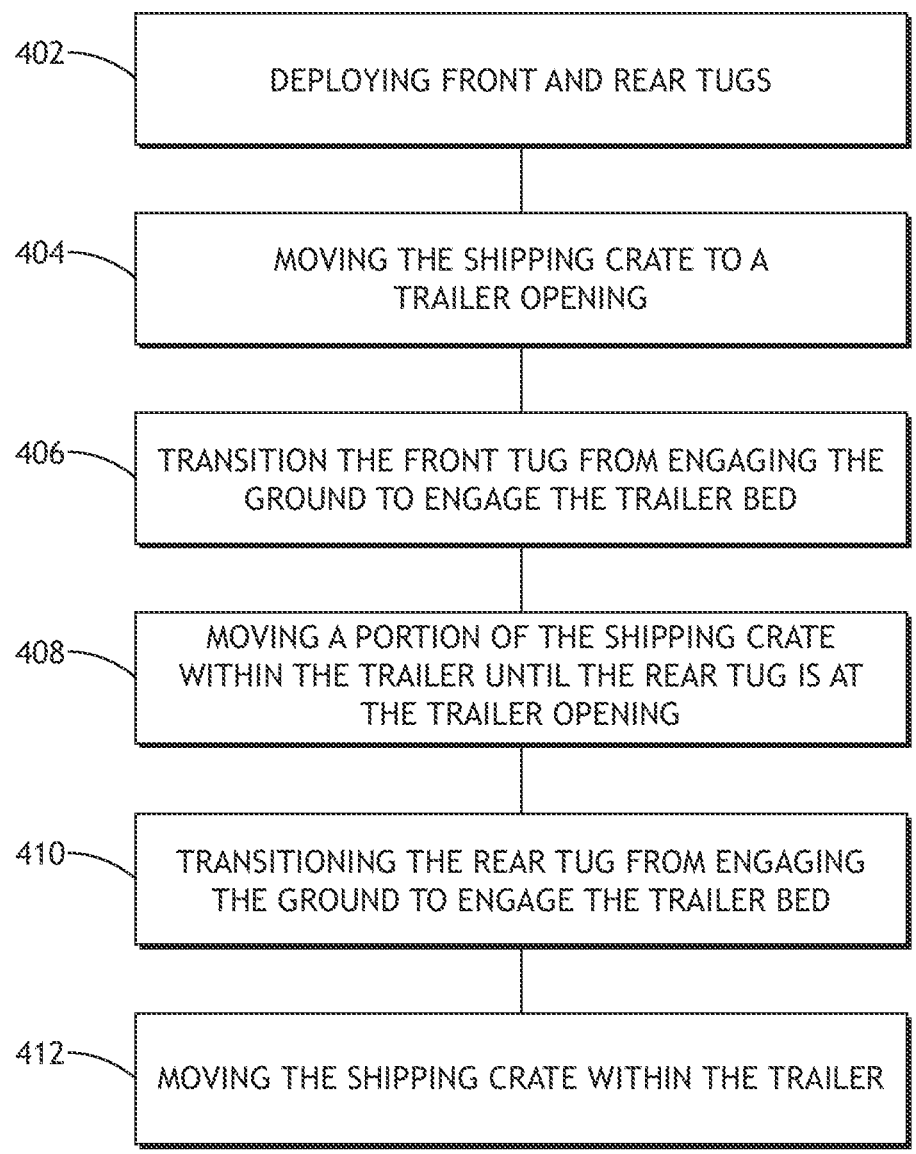
FIG. 4 illustrates a method for loading a trailer, in accordance with one or more embodiments of the present disclosure.

FIG. 4 illustrates a flow diagram view of a method 400 for loading a shipping crate into a trailer, in accordance with one or more embodiments of the present disclosure. The embodiments and the enabling technologies described previously herein in the context of the system 100 and the actuation device 103 should be interpreted to extend to the method 400. It is further recognized herein that the method 400 is not limited to the system 100 or the actuation device 103.

In a step 402, front and rear tugs may be deployed. (see FIGS. 1B-1C, for example). The tugs may be deployed by first tilting the tugs from a first position to a second position. The first position may correspond to a position where the tugs are parallel to an end face of the trailer and has a minimal profile. The second position of the tugs may correspond to a position where the tugs are parallel to a bottom of the trailer or a ground surface. For example, in FIGS. 1A-1B the tug 118 disposed at a rear of the system 100 may be in a stowed position which is substantially perpendicular to the ground. In FIG. 1C the tug has been rotated to be parallel to the ground. The tugs may be further deployed by extending the center columns which connect the tugs to the shipping crate. For example, in FIG. 1C the center column 106 connected to the rear of the trailer is extended to raise the rear of the shipping crate 102. In addition to the tugs, the front and rear telescoping columns may be extended such that casters connected to the telescoping columns come into contact with the ground. For example, in FIG. 1C the telescoping columns 104 are extended and the casters 112 come into contact with the ground 114. The telescoping columns may be used to improve the stability of the shipping crate during transport. The length of the telescoping columns may be locked when extended to prevent slipping of the telescoping columns. By way of another example, in FIG. 1D the telescoping columns 104 and the center column 106 connected to the front of the shipping crate 102 may be similarly extended to raise the front of the shipping crate 102.

In a step 404, the shipping crate is moved to a trailer opening. The shipping crate may be moved by one or more of the tugs or the casters. For example, in FIG. 1E an orientation of the tugs 118 connected to the front and the rear of the trailer may be used to control a path travelled by the shipping crate 102. The tugs 118 may be powered to drive the shipping crate 102.

In a step 406, the front tug may be transitioned from engaging the ground to engaging the trailer bed. To transition the front tug to engage the trailer bed, the front tug may first be rotated from being parallel with the ground to a stowed position (e.g., substantially perpendicular to the ground or the trailer bed). the front center columns may then be retracted to raise a height of the front tug from the ground to the trailer bed. The front tug may then be rotated from the stowed position to be parallel with the trailer. The center column may then be extended such that the front tug may lift the front end of the shipping crate, and similarly lift the front telescoping columns and the casters from the ground. For example, in FIG. 1I the tug 118 connected to the front of the shipping crate 102 has been transitioned to engaging the trailer bed, thereby raising the front end of the shipping crate (and similarly lifting the front casters from the ground). The front telescoping columns may then be raised (e.g., by a winch or jackscrew) after the front tug engages with the trailer bed. For example, the front telescoping columns may now be raised because the portion of the shipping crate 102 load carried by the front telescoping columns has been removed and is now carried by the front center column and tug. The front telescoping columns may be retracted to raise the front casters above the trailer bed. The front tug and the rear tug may now be configured to move the shipping crate further into the trailer without interfering with the front casters. Optionally, the front telescoping columns may be extended until the front casters are in contact with the trailer bed. By the contact between the casters and the trailer bed, a stability of the shipping crate may be improved.

In a step 408, the shipping crate may be moved within the trailer until the rear tug is at the trailer opening. The shipping crate may be moved by one or more of the front tug or rear tugs or the front casters or rear casters. The rear tug may be at the trailer opening when the rear center column or the rear telescoping columns will interfere with the trailer bed. For example, in FIGS. 1G and 1H the shipping crate 102 is moved further into the shipping crate.

In a step 410, the rear tug may be transitioned from engaging the ground to engage the trailer bed. The rear tug may be transitioned from engaging the ground to engaging the trailer bed. To transition the rear tug from engaging the ground to engaging the trailer bed, the rear telescoping columns may be retracted to raise the rear casters from the ground. For example, in FIG. 1H the casters 112 connected to the rear of the shipping crate 102 are retracted by the telescoping columns 104 connected to the rear of the shipping crate 102. The casters may be raised to a height above the trailer bed, such that the casters will not interfere with the trailer bed. The shipping tugs may then be engaged to move the shipping crate forward, such that the rear casters are above the trailer bed. The telescoping columns coupled to the rear of the shipping crate may then be extended such that the rear casters engage with the trailer bed. The telescoping columns may then be locked in place, such that the rear casters may carry a portion of weight from the shipping container when the tug is raised. The tug coupled to the rear of the shipping crate may then be rotated from being parallel with the ground to a stowed position (e.g., substantially perpendicular to the ground or the trailer bed) and the rear center column may be retracted to raise the rear tug to a position above the trailer opening. The front tug may then move the shipping crate further into the trailer. The rear tug may then be rotated from the stowed position to a position parallel to the trailer bed and the rear center column may extend to lower the rear tug may onto the trailer bed to raise the rear end of the shipping crate, and similarly raise the rear telescoping columns and the rear casters from the ground. The rear telescoping columns may now be unlocked for fully retracting the casters.

In a step 412, the shipping crate is moved within the trailer by the front tug and the rear tug. The shipping crate may be moved further inside the trailer so that the rear telescoping columns and the rear casters are within the trailer. Each of the front and rear telescoping columns and the front and rear center columns may then be fully retracted, such that a bottom of the shipping crate is resting on the trailer bed. The rear tug may be stowed when the rear center column is raised, by rotating the rear tug from being parallel to the trailer to the stowed position and retracting the center column. The shipping crate is now fully stowed within the trailer and the trailer together with the shipping crate may be transported by a truck. For example, in FIG. 1L the tug 118 has been stowed and a bottom of the shipping crate is resting on the trailer bed, such that the shipping crate is unlikely to move during shipping.

The method 400 described above may similarly be performed to unload the shipping crate from the trailer. For example, the steps of the method 400 may be performed in a reverse manner to unload the shipping crate from the trailer. Thus, the shipping crate may be loaded and unloaded from a trailer without the use of a forklift.

Referring generally again to FIGS. 1A-4, although the system 100 is depicted as occupying a substantial portion of the trailer 116, this is not intended as a limitation. For example, the system 100 may be any suitable length for loading and unloading. In this regard, a plurality of systems 100 may be loaded within a trailer 116. Similarly, the shipping crate 102 component of the system 100 may be configured to be a substantially similar size to conventional shipping containers, including, but not limited to, 20 or 40 feet.

In some embodiments, the shipping crate 102 includes one or more corner casting (not depicted) at a bottom corner of the shipping crate 102. The corner castings may receive one or more twist locks to secure a bottom end of the shipping crate 102. The corner casting may include an oval shaped hole on the bottom of the shipping crate 102 (e.g., approximately 4.9 inches long by 2.5 inches wide, with rounded edges.

In some embodiments, the shipping crate 102 is configured to be vertically stackable. For example, the shipping crate 102 may have one or more interior support structures (not depicted). The interior support structures may provide enhanced stability and load resistance. In this regard, the shipping crate 102 may bear the weight of one or more additional shipping crates 102 stacked above the shipping crate 102. Similarly, the shipping crate 102 may use one or more twist locks and corner castings to secure the vertically stacked shipping crates 102. The ability to vertically stack the shipping crate 102 may be advantageous when the shipping crate 102 is being stored for a period to minimize a footprint the shipping crate 102.

Although much of the present disclosure is described in the context of a system 100 for loading and unloading a trailer 116, this is not to be regarded as a limitation on the present disclosure, unless noted otherwise herein. It is contemplated that embodiments of the present disclosure may be applied to alternative and/or additional devices, systems, or methods.

In some embodiments, the system 100 may be configured for use with transportable means other than the trailers 116 with enclosed casings enclosed trailers depicted, such as, but not limited to, a flat-bed trailer, a transport container ships, or other bulk transport carriers.

In some embodiments, the actuation device 103 may be detachably attached to the shipping crate 102. Similarly, the actuation device 103 may be detachably attached to existing shipping containers (e.g., 8 foot by 20 foot, 8 foot by 40 foot, etc.). The shipping container may be any kind of shipping container suitable for movement control by the actuation device 103, such as, but not limited to a dry container, a flat rack container, an open top container (with or without a door), an open side container (with or without a door), a refrigerated container, or a container storage tank. In this regard, the actuation device 103 may be used to load and unload such shipping containers from a tractor-trailer (or other hauling actuation device, such as but not limited to a train, or a cargo ship) without the use of a forklift. Where the actuation device 103 is detachably attachable onto shipping containers, the actuation device 103 may further include independent power and control.

In some embodiments, the shipping crate 102 may include the actuation device 103 at a first end of the shipping crate 102. The shipping crate 102 may further include one or more fork recesses (not depicted) at a second end. The one or more fork recesses may be defined by one or more surfaces of the shipping crate 102 and may be suitable for receiving one or more forks of a forklift. The first end of the shipping crate 102 may be disposed at a location closest to a truck cab when the shipping crate 102 is held by the trailer 116. Similarly, the second end may be furthest away from the truck when the shipping crate 102 is held by the trailer 116. In this regard, when the shipping crate 102 is inserted into the trailer 116, the first end may be loaded by the telescoping columns 104 and the vertically adjustable center columns 106. The second end of the shipping crate 102 may then be loaded by forklift. The ability to load by a combination of the actuation device 103 and forklift may allow for the loading a shipping crate 102 which has a door disposed on the second end (e.g., a double door shipping container) instead of a sidewall 108. In this regard, the actuation device 103 may be permanently attached to the shipping crate 102 without reducing the functionality of the shipping crate 102. Similarly, the actuation device 103 may be retrofitted onto existing shipping containers. In other embodiments, the shipping crate 102 includes a first of the actuation device 103 at the first end and a second of the actuation device 103 at a second end.

In some embodiments, the shipping crate 102 is configured as a portable medical isolation ward. In this regard, the system 100 be unloaded and placed outside of a hospital. The actuation device 103 may then be detached from the shipping crate 102 for unloading and placing other medical isolation wards at said hospital or at another location. Biosafety levels provide a criteria of biocontainment precautions required to isolate bacterium, viruses, protozoans, parasites, funguses, or other biological agents in a biocontainment suite. Considerations for the design of biocontainment facilities include worker protection, ability to care for a patient (if patients have been exposed to the bioagent), and the containment of the bioagent to the treatment site. The Center for Disease Control provides laboratory biosafety level criteria for facility design in the Biosafety Microbiological Biomedical Laboratories publication (BMBL). The BMBL indicates that most laboratory work is performed in BSL-1 or BSL-2 facilities where exposure to the bioagent is most likely due to direct contact with the agent or by inadvertent contact through contaminated work environments. Further recommendations for handling air within biocontainment facilities may be found in the ASHRAE Laboratory Design Guide published by the American Society of Heating, Refrigerating, and Air-Conditioning Engineers. Due to a high demand for treatment, COVID 19 exposed individuals have preempted hospital bed space from non-COVID patients. The treatment of COVID patients in the general hospital setting provides an increased risk of exposure to the workers treating such patients as well as any non-COVID patients within the hospital. Furthermore, the reduced number of available beds has provided detrimental for patients awaiting non-essential hospital treatments.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An actuation device comprising:
   a first column and a second column, each of the first column and the second column including an inner portion and an outer portion, wherein each of the first column and the second column are configured to extend and retract by telescoping the inner portion relative to the outer portion;
   a first caster and a second caster, the first caster coupled to an end of the first column, the second caster coupled to an end of the second column;
   a center column positioned between the first column and the second column, the center column pivotably connected to the first column and the second column at a first end of the center column, wherein the center column is configured to extend and retract, wherein the first column and the second column are configured to extend when the center column is extended and remain extended when the center column is retracted, wherein each of the first caster and the second caster are configured to support at least a portion of the center column when the center column is retracted; and
   a drive unit pivotably connected to a second end of the center column, the drive unit configured to engage a ground surface when the center column is extended.

2. The actuation device of claim 1, wherein the first caster is coupled to the inner portion of the first column.

3. The actuation device of claim 1, further comprising at least one winch, the at least one winch coupled to the inner portion and the outer portion of at least one of the first column or the second column, wherein the at least one winch is configured to retract the at least one of the first column or the second column.

4. The actuation device of claim 1, further comprising at least one jackscrew, the at least one jackscrew coupled to the inner portion and the outer portion of at least one of the first column or the second column, wherein the jackscrew is configured to retract the at least one of the first column or the second column.

5. The actuation device of claim 1, further comprising a locking mechanism for the first column and the second column.

6. The actuation device of claim 1, wherein the drive unit comprises an electric drive unit.

7. The actuation device of claim 1, wherein the center column comprises three-stages.

8. The actuation device of claim 1, wherein the actuation device is configured to couple with an end of a shipping crate.

9. A system comprising:
   a shipping crate including a first end and a second end, the shipping crate including a door between the first end and the second end of the shipping crate, the door configured to open for accessing an interior of the shipping crate;
   a first actuation device coupled to the first end of the shipping crate, the first actuation device configured to lift the first end of the shipping crate; and
   a second actuation device coupled to the second end of the shipping crate, the second actuation device configured to lift the second end of the shipping crate, wherein each of the first actuation device and the second actuation device comprise:
      a first column and a second column, each of the first column and the second column including an inner portion and an outer portion, wherein each of the first column and the second column are configured to extend and retract by telescoping the inner portion relative to the outer portion;
      a first caster and a second caster, the first caster coupled to an end of the first column, the second caster coupled to an end of the second column;
      a center column positioned between the first column and the second column, the center column pivotably connected to the first column and the second column at a first end of the center column, wherein the center column is configured to extend and retract, wherein the first column and the second column are configured to extend when the center column is extended and remain extended when the center column is retracted, wherein each of the first caster and the second caster are configured to support at least a portion of the center column when the center column is retracted; and
      a drive unit pivotably connected to a second end of the center column, the drive unit configured to engage a ground surface when the center column is extended.

10. The system of claim 9, further comprising a cable coupled to the center column of at least one of the first actuation device or the second actuation device, wherein the cable is configured to restrict an angle of rotation in which the center column may pivot.

11. The system of claim 9, wherein the door is hinged along a roof of the shipping crate.

12. The system of claim 11, further comprising two actuators, wherein the two actuators are configured to open and close the door.

13. The system of claim 11, wherein the door extends along a substantial portion of the shipping crate, wherein a plurality of forklifts or pallet jacks are configured to access the interior of the shipping crate at a time by the door.

14. The system of claim 9, wherein the first column and the second column of the first actuation device are each disposed at a pitch relative to the ground.

15. The system of claim 14, wherein the first column and the second column of the first actuation device are angled at a pitch of 8 to 2.

16. The system of claim 9, wherein the first column and the second column of the first actuation device are configured to extend four feet, wherein the first caster and the second caster of the first actuation device are ten feet apart when the first column and the second column of the first actuation device are extended.

17. The system of claim 16, wherein the first caster and the second caster of the first actuation device are eight feet apart when the first column and the second column of the first actuation device of the shipping crate are retracted.

18. The system of claim 9, wherein the system is configured to be loaded into a fifty-three-foot-long trailer by the first actuation device and the second actuation device.

19. The system of claim 9, wherein a bottom surface of the shipping crate is configured to be at least four feet off of the ground surface when the first column and the second column of the first actuation device and the second actuation device are extended.

* * * * *